(12) United States Patent
Zhou et al.

(10) Patent No.: US 10,533,595 B2
(45) Date of Patent: Jan. 14, 2020

(54) MANUAL ADJUSTABLE TENSIONING DEVICE

(71) Applicant: CITIC Dicastal CO., LTD., Qinhuangdao, Hebei (CN)

(72) Inventors: Ruixiao Zhou, Qinhuangdao (CN); Fengbao Luo, Qinhuangdao (CN); Xiao Liu, Qinhuangdao (CN); Dengyao Li, Qinhuangdao (CN); Weidong Liu, Qinhuangdao (CN); Minghua Liu, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 247 days.

(21) Appl. No.: 15/797,474

(22) Filed: Oct. 30, 2017

(65) Prior Publication Data
US 2019/0040898 A1 Feb. 7, 2019

(51) Int. Cl.
*F16B 31/00* (2006.01)
*F16B 31/04* (2006.01)

(52) U.S. Cl.
CPC .................. *F16B 31/04* (2013.01)

(58) Field of Classification Search
CPC ....................................... F16B 31/04
USPC ....................................... 411/14.5
See application file for complete search history.

(56) References Cited

U.S. PATENT DOCUMENTS

| 3,243,879 | A | 4/1966 | Gill | |
|---|---|---|---|---|
| 7,559,135 | B2 * | 7/2009 | Rode | B25B 27/062 29/724 |
| 8,893,364 | B2 * | 11/2014 | Rode | B23P 11/00 29/407.05 |
| 9,850,943 | B1 * | 12/2017 | Rode | F16B 39/04 |

FOREIGN PATENT DOCUMENTS

| CN | 2040820 U | 7/1989 |
|---|---|---|
| CN | 101357721 A | 2/2009 |
| CN | 104625549 A | 5/2015 |
| CN | 105880659 A | 8/2016 |
| CN | 205904468 U | 1/2017 |
| CN | 106363434 A | 2/2017 |
| CN | 207086950 U | 3/2018 |
| DE | 202014100502 U1 | 6/2015 |

* cited by examiner

*Primary Examiner* — Gary W Estremsky
(74) *Attorney, Agent, or Firm* — Cooper Legal Group, LLC

(57) ABSTRACT

Disclosed is a manual adjustable tensioning device. Slope guide slots are formed in the periphery of a lead screw nut, and contacts are provided with slopes having the same angles and placed in the guide slots of the lead screw nut; two ends of a lead screw are respectively supported in threaded holes of a shell and an end cover; screws are connected to the lead screw nut via threaded holes, the tail end of each screw is in contact with one end of a lever, the other end of the lever is in contact with the slope of the lead screw nut, a roller is mounted at the tail end of the lever, and an extension spring is mounted at the end of the slope of the lead screw nut.

1 Claim, 3 Drawing Sheets

MANUAL ADJUSTABLE TENSIONING DEVICE

CROSS-REFERENCE TO RELATED APPLICATIONS

The present application claims benefit of Chinese Patent Application No. 201710746828.5, filed on Aug. 27, 2017, the contents of which are hereby incorporated by reference in its entirety.

BACKGROUND

In the machining process of an automobile hub, the central hole of the hub needs to be clamped by a tensioning device. At present, most tensioning devices are driven by motors or hydraulic pressure. The tensioning devices driven by motors need deceleration mechanisms, and some even need brakes, so that the whole tensioning devices are too large, too high in cost and inconvenient to operate. The tensioning devices driven by hydraulic pressure need dedicated hydraulic valves, hydraulic pumps and complete hydraulic loops, so the costs are higher. Besides, the traditional electric or hydraulic driven tensioning mechanisms consume considerable electric energy.

In some small-scale machining or hub repair occasions, some tensioning devices which are small, convenient to operate and low in energy consumption are urgently needed.

SUMMARY

The disclosure relates to a fixing device, specifically to a tensioning device.

The disclosure is aimed at providing a manual adjustable tensioning device for a hub machining process.

In order to fulfill the above aim, the disclosure adopts the following technical solution: a manual adjustable tensioning device is composed of a handle, a lead screw, a lead screw nut, contacts, force sensors, screws, levers, rollers, springs, a shell and an end cover. Slope guide slots are formed in the periphery of the lead screw nut, and the contacts are provided with slopes having the same angles and placed in the guide slots of the lead screw nut. When the handle is rotated, the lead screw rotates, and drives the lead screw nut to move linearly. When the lead screw nut moves up and down, the contacts can be driven to expand and retract via the slopes. Two ends of the lead screw are respectively supported in threaded holes of the shell and the end cover; because the threaded connection has self-locking property, when the handle is rotated to the required position, the lead screw can be self-locked; and at the moment, the position of the lead screw nut is not changed, and the contacts can keep constant tensioning force all the time.

The device of the disclosure passes through inner holes of a hub machining base and a hub, and is fixed on a base.

When the contacts are fixed at certain positions, if the tensioning force error, detected by the force sensor, of each contact exceeds the allowable range, the screw needs to be rotated to finely adjust the tensioning force of each contact. The screws are connected to the lead screw nut via threaded holes, the tail end of each screw is in contact with one end of the lever, the other end of the lever is in contact with the slope of the lead screw nut, a roller is mounted at the tail end of the lever to prevent too large friction, and an extension spring is mounted at the upper part of the slope of the lead screw nut to ensure the slope of the lead screw nut is in contact with the roller all the time. When the screw is rotated, the screw enables one end of the lever to rotate, the other end of the lever also rotates a certain angle, and the roller pressing the slope of the lead screw nut jogs, so that the purpose of finely adjusting the tensioning force of the contact is fulfilled.

The purpose of manually driving the tensioning device is fulfilled by simple lead screw transmission and slope contact, and the tensioning force of each contact can be manually adjusted by a simple lever mechanism, so the device is simple in principle, compact in structure, small in size, low in cost and environment-friendly, hardly consumes power except extremely low power consumption needed by the sensors, and has a broad application prospect in small-scale hub machining or repair occasions.

Figure 1:
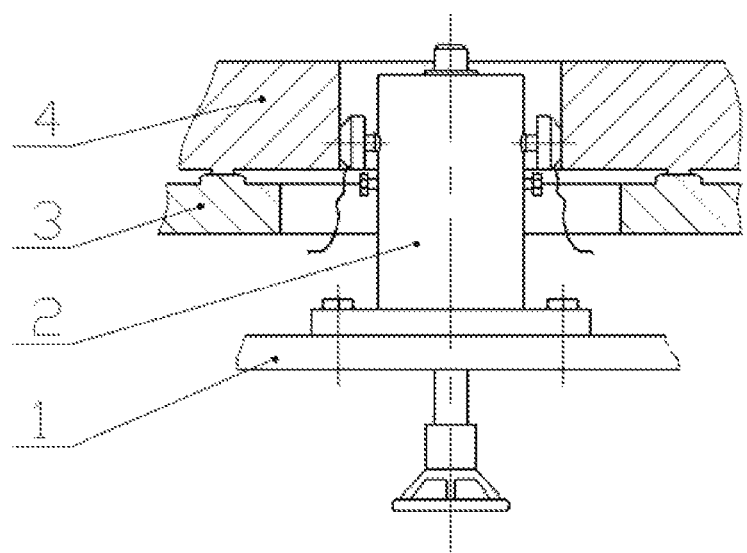
FIG. 1 is a mounting schematic diagram of a manual adjustable tensioning device of the disclosure.
Figure 2:
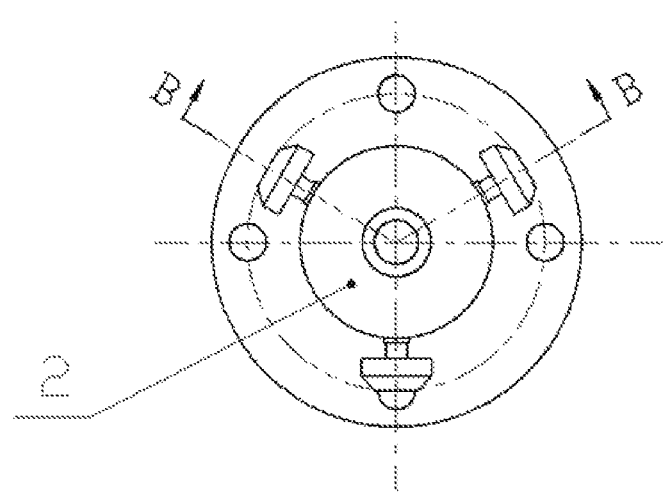
FIG. 2 is a top view of the manual adjustable tensioning device of the disclosure.
Figure 3:
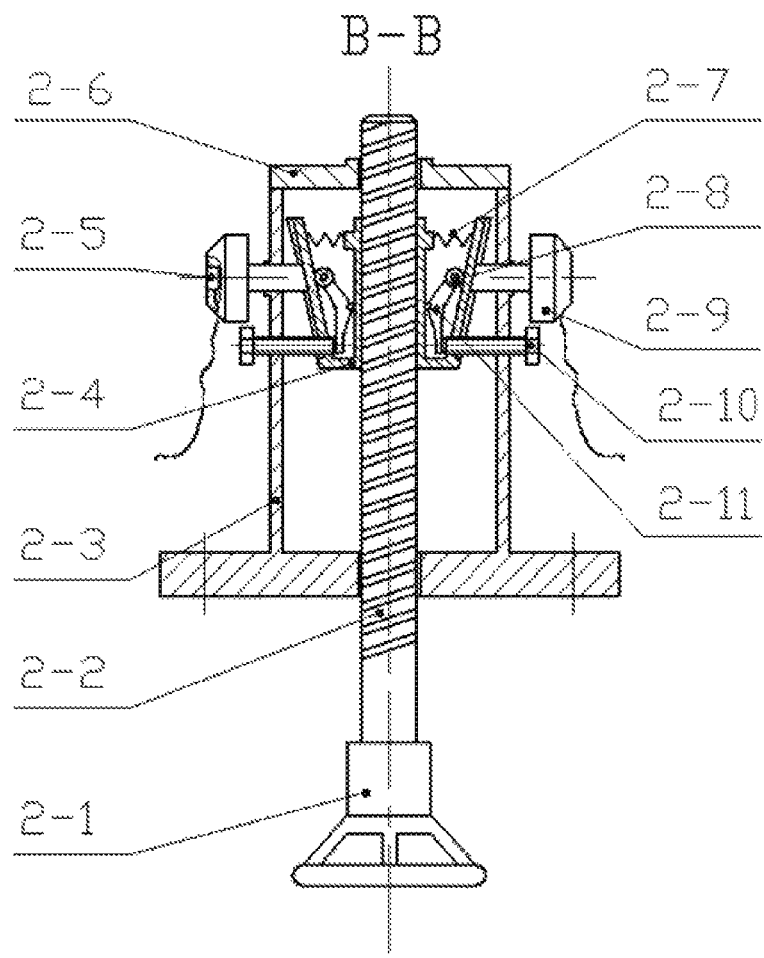
FIG. 3 is a section view in the B-B direction.

LIST OF REFERENCE SYMBOLS 1 base,
2 manual adjustable tensioning device
3 hub machining base
4 hub
2-1 handle
2-2 lead screw
2-3 shell
2-4 lead screw nut
2-5 force sensor
2-6 end cover
2-7 spring
2-8 roller
2-9 contact
2-10 screw
2-11 lever

DETAILED DESCRIPTION

Details and working conditions of a device provided by the disclosure will be specified below in combination with the accompanying drawings.

A manual adjustable tensioning device is composed of a handle 2-1, a lead screw 2-2, a lead screw nut 2-4, contacts 2-9, force sensors 2-5, screws 2-10, levers 2-11, rollers 2-8, springs 2-7, a shell 2-3 and an end cover 2-6. Slope guide slots are formed in the periphery of the lead screw nut 2-4, and the contacts 2-9 are provided with slopes having the same angles and placed in the guide slots of the lead screw nut 2-4. When the handle 2-1 is rotated, the lead screw 2-2 rotates, and drives the lead screw nut 2-4 to move linearly. When the lead screw nut 2-4 moves up and down, the contacts 2-9 can be driven to expand and retract via the slopes. Two ends of the lead screw 2-2 are respectively supported in threaded holes of the shell 2-3 and the end cover 2-6; because the threaded connection has self-locking property, when the handle 2-1 is rotated to the required position, the lead screw 2-2 can be self-locked; and at the moment, the position of the lead screw nut 2-4 is not changed, and the contacts 2-9 can keep constant tensioning force all the time.

When the contacts 2-9 are fixed at certain positions, if the tensioning force error, detected by the force sensor, of each contact 2-9 exceeds the allowable range, the screw 2-10 needs to be rotated to finely adjust the tensioning force of each contact 2-9. The screws 2-10 are connected to the lead screw nut 2-4 via threaded holes, the tail end of each screw 2-10 is in contact with one end of the lever 2-11, the other end of the lever 2-11 is in contact with the slope of the lead screw nut 2-4, a roller 2-8 is mounted at the tail end of the lever 2-11 to prevent too large friction, and an extension spring 2-7 is mounted at the end of the slope of the lead screw nut 2-4 to ensure the slope of the lead screw nut 2-4 is in contact with the roller 2-8 all the time. When each screw 2-10 is rotated, the screw 2-10 enables one end of the lever 2-11 to rotate, the other end of the lever 2-11 also rotates a certain angle, and the roller 2-8 pressing the slope of the lead screw nut 2-4 jogs, so that the purpose of finely adjusting the tensioning force of the contact 2-9 is fulfilled.

The device of the disclosure passes through inner holes of a hub machining base 3 and a hub 4, and is fixed on a base 1.

The invention claimed is:

1. A manual adjustable tensioning device, comprising a handle, a lead screw, a lead screw nut, contacts, force sensors, screws, levers, rollers, springs, a shell and an end cover, wherein slope guide slots are formed in the periphery of the lead screw nut, and the contacts are provided with slopes having the same angles and placed in the guide slots of the lead screw nut; two ends of the lead screw are respectively supported in threaded holes of the shell and the end cover; the screws are connected to the lead screw nut via threaded holes, the tail end of each screw is in contact with one end of the lever, the other end of the lever is in contact with the slope of the lead screw nut, a roller is mounted at the tail end of the lever, and an extension spring is mounted at the end of the slope of the lead screw nut.

* * * * *